United States Patent [19]
Sullivan et al.

[11] Patent Number: 5,068,779
[45] Date of Patent: Nov. 26, 1991

[54] DEGREE OF FREEDOM DIGITAL CONTROL SYSTEM FOR A HYDRAULIC PRESS

[75] Inventors: Michael T. Sullivan, Bloomington; Gary S. Tock, St. Louis Park, both of Minn.

[73] Assignee: MTS Systems Corporation, Minneapolis, Minn.

[21] Appl. No.: 329,572

[22] Filed: Mar. 28, 1989

[51] Int. Cl.$^5$ .......................... G06F 15/46; B29C 3/06
[52] U.S. Cl. .............................. 364/167.01; 264/40.5; 425/150; 364/476
[58] Field of Search .................. 364/167.01, 473, 476; 264/40.1, 40.3, 40.5, 40.7; 425/135, 145, 150, 162, 163, 167; 100/53, 99

[56] References Cited

U.S. PATENT DOCUMENTS

| | | | |
|---|---|---|---|
| 3,742,324 | 6/1973 | Gross et al. | 318/591 |
| 3,800,588 | 4/1974 | Larson et al. | 73/71.6 |
| 3,911,732 | 10/1975 | Larson | 73/71.6 |
| 3,918,298 | 11/1975 | Petersen et al. | 73/71.6 |
| 4,457,684 | 7/1984 | Gram | 425/451.9 |
| 4,458,189 | 7/1984 | Dollerschell | 318/591 |
| 4,470,787 | 9/1984 | Gram | 425/150 |
| 4,473,215 | 9/1984 | Rathfon, II et al. | 364/476 X |
| 4,674,053 | 6/1987 | Bannal et al. | 364/476 |
| 4,802,367 | 2/1989 | Petersen et al. | 73/805 |

OTHER PUBLICATIONS

MTS Systems Corporation, *System Functional Description for MTS Series 867 Fleximatix Compression Molding Press*, Aug. 21, 1986, pp. 1—16-43.
Dennis H. Andersen and Arthur F. Lawrence, *SAE Technical Paper Series*, "Precision Control Effects on Productivity of Compression Molding", 1983, pp. 1-8.
MTS Systems Corporation, *Product Specification*, "Model 440.38 Axial Strain Computer", 1974, pp. 1 and 3-6.
MTS Systems/Corporation, *MTS Crack Correlator*, undated, 6 pages.
MTS Systems Corporation, *Software for Automated Material Tests from MTS*, "$K_{IC}$ Fracture Toughness Test", undated 6 pages.
MTS Systems/Corporation, *Software for Automated Material Tests from MTS*, "$J_{IC}$ Fracture Toughness Test", undated, 6 pages.
MTS Systems Corporation, *Software for Automated Material Tests from MTS*, "Fatigue Crack Growth Test", undated, 6 pages.
MTS Systems Corporation, *867 SMC Press Machine Control Console*, 1976, pp. iii and 1—1.
MTS Systems Corporation, *867 SMC Press Valve Driver Module*, 1987 pp. iii and 1—1 to 1—3.
MTS Systems Corporation, *867 SMC Press Hybrid Summing Module*, 1987 pp. iii and 1—1 to 1-2.
MTS Systems Corporation, *867 SMC Press DOF Balance Module*, 1987 pp. iii and 1—1 to 1-2.
MTS Systems Corporation, *867 SMC Press ECC Chassis "A"*, 1987 pp. iii and 1—1.
MTS Systems Corporation, *867 SMC Press ECC Chassis "B"*, 1987 pp. iii and 1—1.
MTS Systems Corporation, *867 SMC Press Force Summing Module*, 1987 pp. iii and 1—1 to 1-2.
MTS Systems Corporation, *867 SMC Press Hybrid Mode Switch Module*, 1987 pp. iii and 1—1.
MTS Systems Corporation, *867 SMC Press Electronic Control Console*, 1987 pp. iii, iv and 1—1 to 1-22.

*Primary Examiner*—Joseph Ruggiero
*Attorney, Agent, or Firm*—Kinney & Lange

[57] ABSTRACT

A digital computer-based degree of freedom (DOF) control system for driving a moving ram of a hydraulic press about a plurality of degrees of freedom as a function of a preestablished motion control program. Actuators responsive to actuator commands drive the moving ram at a plurality of spaced locations. Digital feedback data representative of the positions and loads of the moving ram at the spaced locations are stored in memory. Motion control data representative of the motion control program is also stored in memory. A digital control computer implementing servoloop operations generates the actuator commands as a function of the feedback data and motion control data.

27 Claims, 6 Drawing Sheets

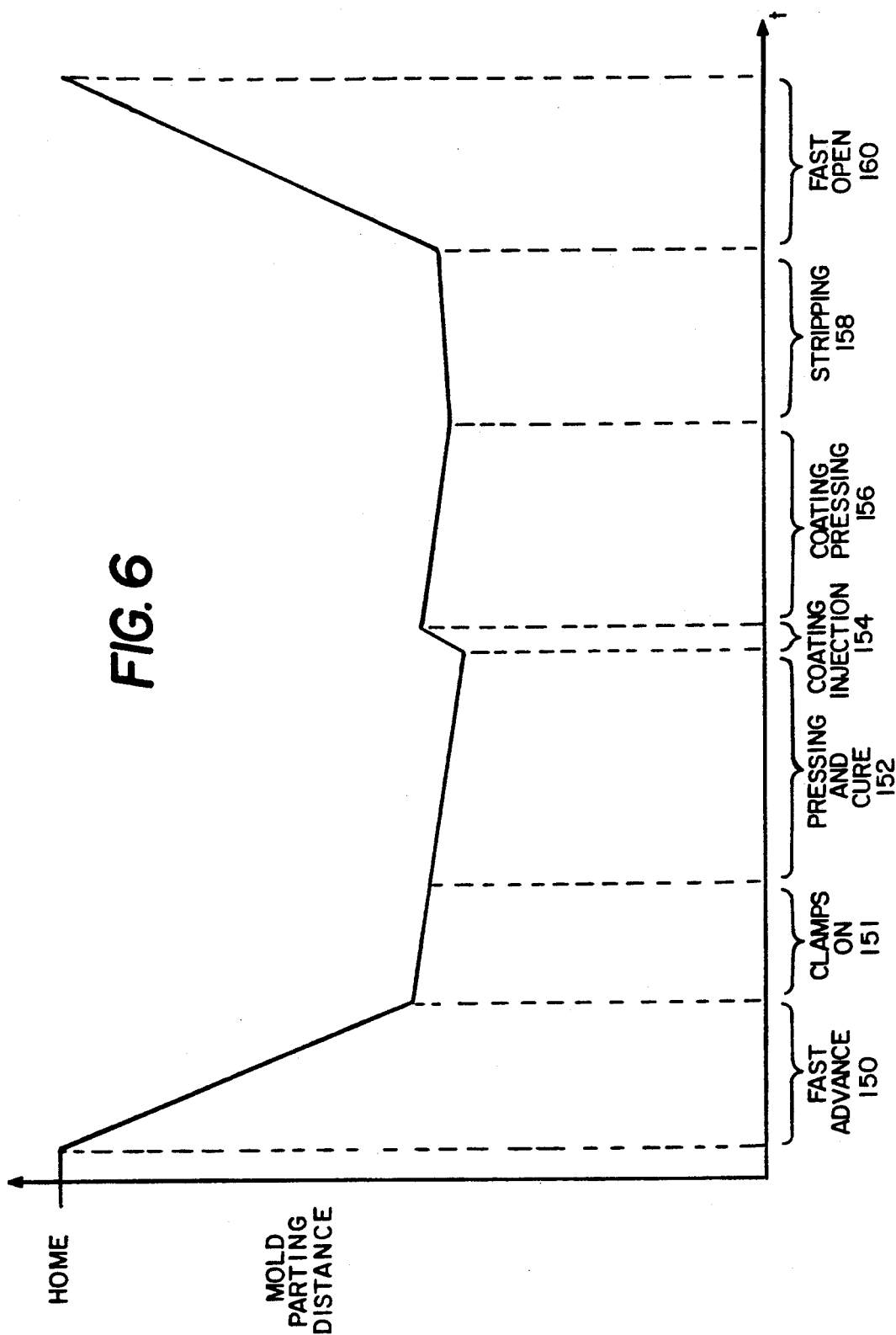

DEGREE OF FREEDOM DIGITAL CONTROL SYSTEM FOR A HYDRAULIC PRESS

BACKGROUND OF THE INVENTION

1. Field of the Invention. s The present invention relates to digital control systems for hydraulic presses.

2. Description of the Prior Art.

Hydraulic presses such as those disclosed in the Gram U.S. Pat. Nos. 4,457,684 and 4,470,787 are commonly used to manufacture parts with sheet molding compound (SMC). Due to the large forces which are developed during the press cycle, a multiple degree of freedom control system is typically used to control the press during molding operations. An analog control system s representative of those used for this purpose is disclosed in the Larson et al. U.S. Pat. No. 3,800,588.

There is, however, a continuing need for improved control systems for use with SMC presses. The control system must be capable of quickly and accurately driving the press through its press cycle. The control system must also be reliable.

SUMMARY OF THE INVENTION

The present invention is a digital computer-based degree of freedom (DOF) control system for driving a movable member about a plurality of degrees of freedom as a function of a preestablished motion control program. Actuators responsive to actuator commands drive the movable member at a plurality of spaced driving locations. Feedback means provide digital position feedback data representative of positions of the moving member at the driving locations, and digital load feedback data representative of loads on the moving member at the driving locations. Data representative of the motion control program as well as the digital load feedback data and digital position feedback data are stored in memory means. The actuator commands are generated by digital control computer means coupled to the actuators, feedback means and memory means. The digital control computer means includes DOF feedback sum means, command generator means, DOF servoloop means, mode select means and DOF output sum means. The DOF feedback sum means computes position, load and/or centroid DOF feedback sums as a function of the position and load feedback data. The command generator means computes position, load and/or centroid servoloop input commands as a function of the motion control program. Position servoloop input servoloop output commands are computed as a function of associated DOF feedback sums and servoloop input commands by the DOF servoloop means. The mode select means selects position , load and/or centroid servoloop output commands as a function of the motion control data. The actuator commands are computed as a function of the selected position, load and/or centroid servoloop output commands by the DOF output sum means.

In one embodiment the actuators include moving ram actuators responsive to moving ram actuator commands, and power module actuators responsive to power module actuator commands. The digital control computer means includes moving ram control computer means for generating the moving ram actuator commands, and power module control computer means for generating the power module actuator commands. The moving ram control computer means and power module control computer means are controlled as a function of the motion control data by press control computer means.

In other embodiments the memory means includes means for storing servoloop gain compensation parameter data. The DOF servoloop means includes means for computing the servoloop output commands as a function of the gain compensation parameter data.

BRIEF DESCRIPTION OF THE DRAWINGS

FIG. 6 is a graphical representation of the press cycle.

DETAILED DESCRIPTION OF THE PREFERRED EMBODIMENTS

1. System Overview

Figure 1:
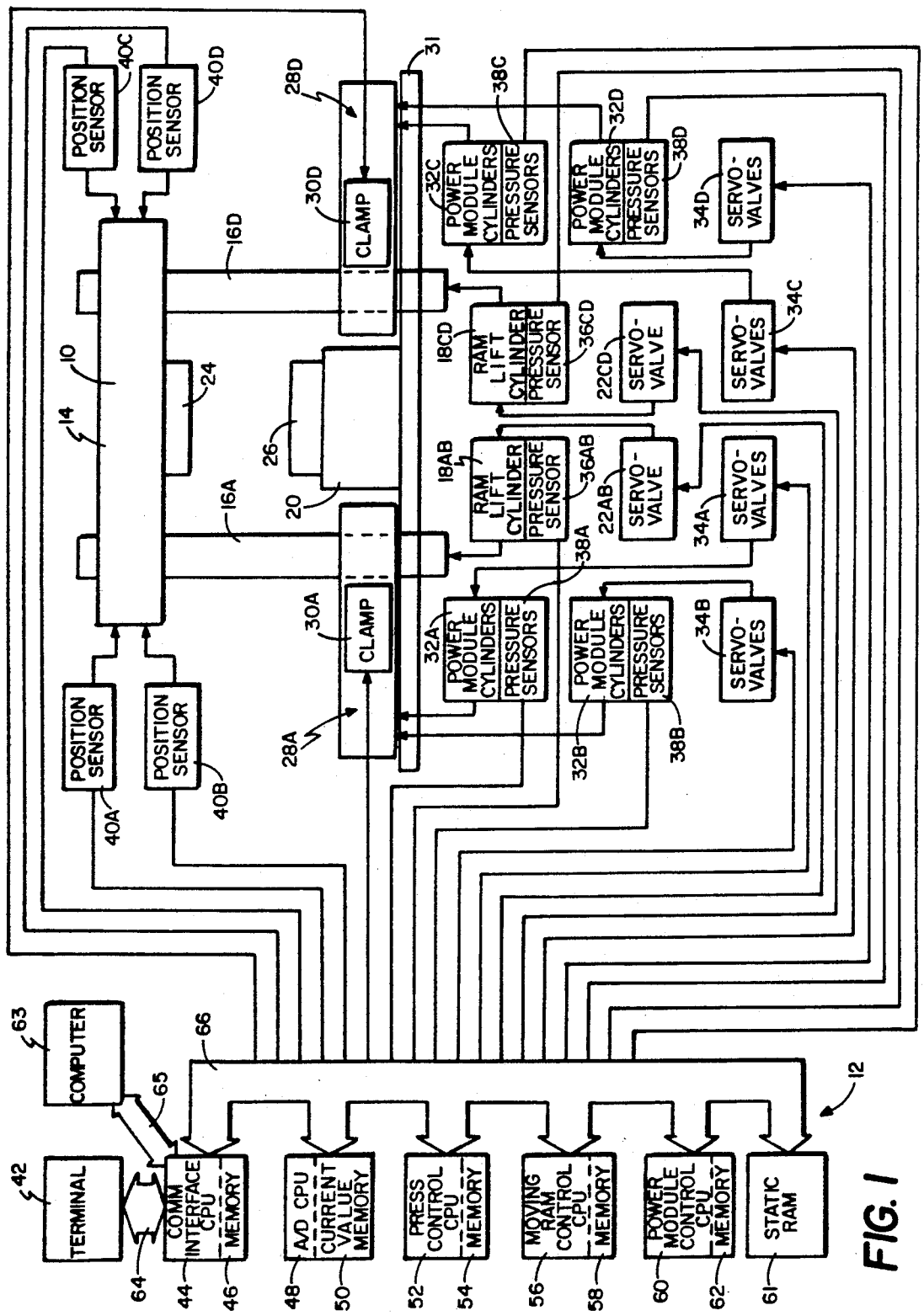
FIG. 1 is a block diagram representation of a hydraulic press and, degree of freedom digital control system in accordance with the present invention.

A hydraulic press 10 and degree of freedom (DOF) digital control system 12 in accordance with the present invention are illustrated generally in FIG. 1. Presses such as 10 are commonly used in sheet molding compound (SMC) manufacturing operations. Control system 12 is a digital computer-based system which controls the motion of hydraulic press 10 as it is driven through its press cycle. A press cycle control program characterizing the desired motion of press 10 as it is driven through its press cycle is stored by control system 12. Control system 12 controls the motion of hydraulic press 10 as a function of the press cycle control program and monitored DOF feedback parameters characteristic of the actual motion of the press (e.g. its roll, pitch, vertical and warp characteristics) to ensure that the desired motion is followed.

Figure 2A:
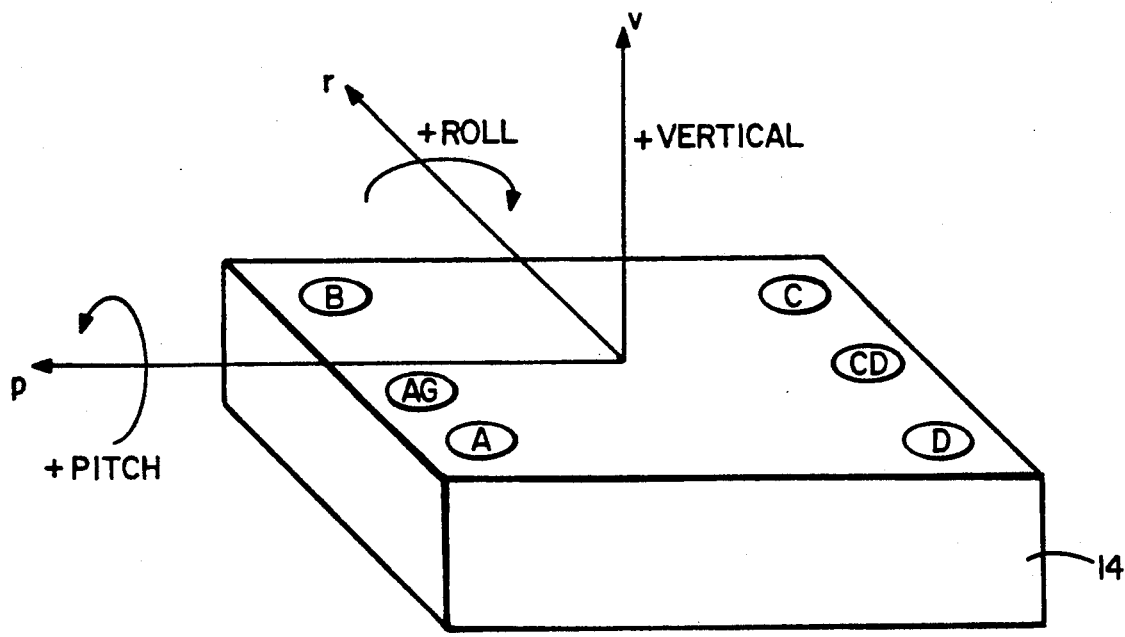
FIGS. 2A and 2B are illustrations of the moving ram shown in FIG. 2, and the locations at which it is driven by power module cylinders 32A–32D and ram lift cylinders 18AB and 18CD.
Figure 2B:
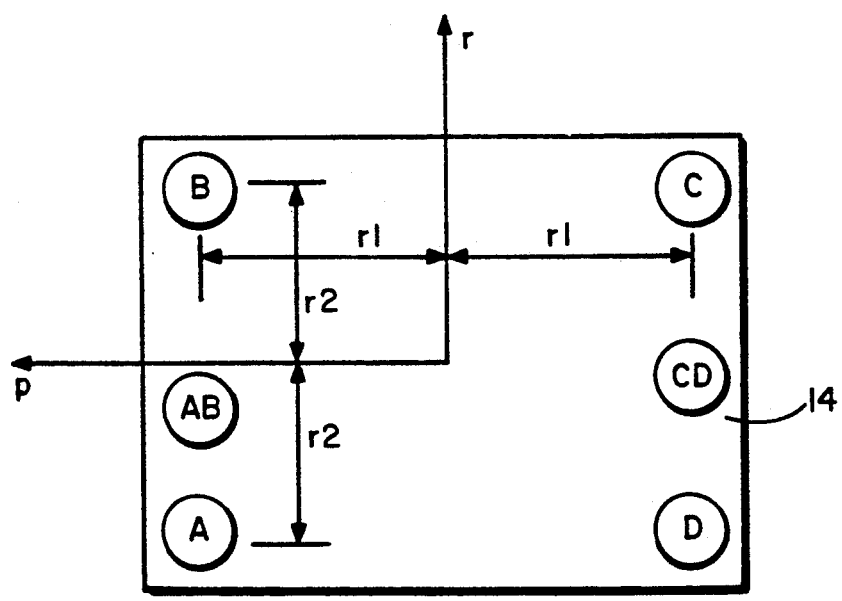

Hydraulic press 10 includes a moving ram 14 mounted at its four corners to columns 16A–16D (only two columns 16A and 16D are shown in FIG. 1). Columns 16A–16D are supported with respect to a stationary base 31 by power modules 28A–28D, respectively (only power modules 28A and 28D are shown in FIG. 1). Moving ram o 14 and columns 16A–16D are raised and lowered with respect to a stationary base 20 by ram lift cylinders 18AB and 18CD. Lift cylinders 18AB and 18CD are controlled by servovalves 22AB and 22CD, respectively, in response to analog servovalve command signals provided by DOF control system 12. As shown, an upper mold member 24 is mounted to the lower side of moving ram 14, while a lower mold member 26 is mounted to an upper surface of base 20. The letters AB and CD designate the projected position on moving ram 14 at which cylinders 18AB, 18CD effectively operate. As shown in FIGS. 2A and 2B, positions AB and CD are on opposite ends of ram 14, intermediate its opposite sides.

As will be described in detail in subsequent portions of this description, moving ram 14 and columns 16A-16D are driven with respect to base 20 by lift cylinders 18AB and 18CD during some portions of the press cycle. During other portions of the press cycle the position of moving ram 14 with respect to base 20 is controlled by power modules 28A-28D (only power modules 28A and 28D are shown in FIG. 1). Power modules 28A-28D include clamps 30A-30D and cylinders 32A-32D, respectively. When actuated by control system 12, clamps 30A-30D clamp onto their respective columns 16A-16D. Power module cylinders 32A-32D are each mounted to a corner of base 31 and are controlled by respective servovalves 34A-34D. In response to servovalve command signals generated by control system 12, power module cylinders 32A-32D drive and position columns 16A-16D, and therefore moving ram 14, with respect to base 20 when clamps 30A-30D are on. Letters A-D designate the projected positions (corners) on moving ram 14 at which cylinders 32A-32D effectively operate through power modules 28A-28D.

Hydraulic cylinders 32A-32D each include a separate pressing cylinder and stripping cylinder (not separately shown). The pressing cylinders are used to drive ram 14 toward base 20 while the stripping cylinders drive the ram away from base 20. Lift cylinders 18AB and 18CD are singleacting cylinders having only an upward force capability. Moving ram 14 is lowered by the force of gravity.

Feedback parameters characteristic of the current operating state of press 10 are provided by lift cylinder pressure sensors 36AB, 36CD, power module pressure sensors 38A-38D and position sensors 40A-40D. Pressure sensors 36AB, 36CD and 38A-38D provide signals representative of the differential pressure (delta P) exerted by respective cylinders 18AB, 18CD and 32A-32D with respect to ambient air pressure. Pressure sensors 38A-38D provide a separate delta P signal for each pressing cylinder and stripping cylinder of cylinders 32A-32D. Pressure sensors 36AB, 36CD and 38A-38D thereby provide signals representative of the force or load being applied to drive points AB, CD, A, B, C and D by the associated cylinders. Position sensors 40A-40D provide signals representative of the vertical displacement or position of moving ram 14 with respect to base 20 at associated drive points A-D. Mold resolver transducers (not shown) for providing signals representative of the distances between corners of mold members 24 and 26 can also be used if greater resolution than that provided by sensors 40A-40D is required.

In the embodiment shown, DOF control system 12 includes terminal 42, communication interface central processing unit (CPU) 44 and associated memory 46, analog-to-digital (A/D) CPU 48 and associated current value memory 50, press control CPU 52 and associated memory 54, moving ram control CPU 56 and associated memory 58, power module control CPU 60 and its associated memory 62 and remote computer 63. DOF control system 12 also includes random access memory (RAM) 61. In one embodiment, RAM 16 is on a battery backed board (i.e. is static RAM). Terminal 42 and communication interface CPU 44 are interfaced by a serial RS 232 bus 64. Communication interface CPU 44 is interfaced to computer 63 via GPIB (IEEE 488) bus 65. CPUs 44, 48, 52, 56 and 60 are all interfaced by means of VME bus 66. Sensors 36AB, 36Cd, 38A-38D and 40A-40D are also interfaced, to control system 12 over bus 66, and can have a A/D card (not separately shown) controlled over the bus.

An operator can interface with DOF control system 12 through terminal 42 and through push buttons of a control panel (not shown). The operator can command press 10 in a manual mode through activation of the push buttons. Press 10 is operated by control system 12, all commands are generated by press control CPU 52. Parameters for various parts of a press cycle and other information required for the operation of hydraulic press 10 and control system 12 are described in a mold process sheet. Parameters from the mold process sheet can be entered into control system 12 through terminal 42 or from remote computer 63 while the computer is running a mold setup task. Information received by terminal 42 is processed by communication interface CPU 44 and distributed to CPUs 48, 52, 56 and 60 as required. Information representative of the current operating state of press 10 and control system 12 is also processed by communication interface CPU 44 and can be displayed to an operator through a monitor (not separately shown) associated with terminal 42.

Feedback signals from sensors 36AB, 36CD, 38A-38D and 40A-40D are periodically digitized feedback frequency by A/D CPU 48. The digitized feedback parameters produced by A/D CPU 48 are stored at indexed locations of current value memory 50. Following the digitization and storage of each current set of feedback parameters, handshake signals are generated by A/D CPU 48 and distributed to ram control CPU 56 and power module control CPU 60 to synchronize their operation. CPUs 44, 52, 56 and 60 all access current value memory 50 to obtain data representative of current feedback parameters. Other digital values calculated by moving ram control CPU 56 and power module control CPU 60, including DOF feedback sums, servoloop input commands, servoloop output commands and DOF output sums (servovalve commands) can also be stored in current value memory 50.

The press cycle control program characterizing the desired operation of moving ram 14 as a function of time is stored within memory 54. Other data including feedback parameter limit levels, DOF output sum limit levels and various threshold parameters accessed by the cycle control program are stored in RAM 61. Press control CPU 52 coordinates the overall operation of hydraulic press 10 by controlling moving ram control CPU 56 and power module control CPU 60.

In response to instructions, commands and data provided by press control CPU 52 and current feedback parameters provided by A/D CPU 48, moving ram control CPU 56 generates lift servovalve command signals used by servovalves 36AB, 36CD to actuate ram lift cylinders 18AB, 18CD. In response to similar information, power module control CPU 60 generates power module servovalve command signals used by servovalves 34A-34D to control the actuation of power module cylinders 32A-32D. To ensure correspondence between the desired motion of moving ram 14 as represented by the press control program stored in memory 54, and the actual motion of the ram, moving ram control CPU 56 and power module control CPU 60 generate their servovalve command signals as a function of the press control program and current DOF feedback sums representative of the current operating state of the moving ram. DOF feedback sums are computed by moving ram control CPU 56 and power module control CPU 60 as a function of feedback parameters stored in current value memory 50.

In the embodiment described herein, moving ram control CPU 56 computes and uses DOF sums representative of vertical and roll degrees of freedom. Power module control CPU 60 computes and uses DOF sums representative of vertical, roll, pitch and warp degrees of freedom. The convention used throughout this description for vertical, roll and pitch degrees of freedom with respect to corresponding axes v, r and p are illustrated in FIG. 2A. The positions on moving ram 14 designated AB, CD, A, B, C, D are the projected positions at which the ram is effectively driven by cylinders 18AB, 18CD, and 32A–32D, respectively. Warp controls the positions of corners A and C of moving ram 14 as they relate to corners B and D.

Power module control CPU 60 also computes and uses roll centroid and pitch centroid characteristics to generate its output commands. These motions of moving ram 14 can be described with reference to FIG. 2B. Roll centroid characterizes the loading moments of moving ram 14 about roll axis r. Similarly, pitch centroid characterizes the loading moments of moving ram 14 about pitch axis p. Although technically not "degrees of freedom", roll centroid and pitch centroid characteristics are equivalent to degrees of freedom and are utilized along with the other degrees of freedom to control the moving ram 14. Roll centroid and pitch centroid are therefore referred to as degrees of freedom throughout the remainder of this description.

2. A/D CPU

As described above, A/D CPU 48 collects and digitizes feedback data from all sensors 36AB, 36CD, 38A–38D and 40A–40D. The digital feedback parameters are scaled and stored at predetermined locations within current value memory 50. To minimize errors introduced into calculations based upon the feedback parameters it is necessary to minimize the skew between the digitization of signals from sensors 36AB, 36CD, 38A–38D and 40A–40D. In other words, each set of stored feedback parameters should be based upon signals taken from sensors 36AB, 36CD, 38A–38D and 40A–40D at one point in time. Press control accuracy is also enhanced by keeping the feedback parameters as current as possible. In one embodiment A/D CPU 48 captures, digitizes and stores feedback parameters at a rate of 150 Hz. Handshake signals representative of this feedback parameter collection process are provided by A/D CPU 48 to ensure synchronous use of substantially contemporaneous feedback parameters by CPUs 56 and 60.

Error checking and linearization procedures can also be implemented by A/D CPU 48. Erroneous feedback parameters which can sometimes be produced can then be discounted to prevent their use in subsequent calculations. The manner of error checking and linearization performed will typically depend upon the characteristics of sensors 36AB, 36CD, 38A–38D and 40A–40D. Error checking techniques which can be implemented for this purpose are generally known. Feedback parameters from hydraulic press 10 which are used by control system 12 are described below in Table 1.

TABLE 1

| Feedback Parameters | | |
|---|---|---|
| $P_{Lab}$ | = | delta P of Ram Lift Cylinder 36AB |
| $P_{Lcd}$ | = | delta P of Ram Lift Cylinder 36CD |

TABLE 1-continued

| Feedback Parameters | | |
|---|---|---|
| $P_{sa}$ | = | delta P of Power Module Stripping Cylinder 38A |
| $P_{sb}$ | = | delta P of Power Module Stripping Cylinder 38B |
| $P_{sc}$ | = | delta P of Power Module Stripping Cylinder 38C |
| $P_{sd}$ | = | delta P of Power Module Stripping Cylinder 38D |
| $P_{pa}$ | = | delta P of Power Module Pressing Cylinder 38A |
| $P_{pb}$ | = | delta P of Power Module Pressing Cylinder 38B |
| $P_{pc}$ | = | delta P of Power Module Pressing Cylinder 38C |
| $P_{pd}$ | = | delta P of Power Module Pressing Cylinder 38D |
| $X_a$ | = | position of Moving Ram 14 at corner A |
| $X_b$ | = | position of Moving Ram 14 at corner B |
| $X_c$ | = | position of Moving Ram 14 at corner C |
| $X_d$ | = | position of Moving Ram 14 at corner D |

3. Press Control CPU 52

The overall operation of hydraulic press 10 is controlled by press control CPU 52 as a function of programs and data stored in memory 54. Press control CPU is connected to receive feedback parameters from current value memory 50. For both moving ram control CPU and power module control CPU 60, press control CPU 52 generates and provides a variety of instructions and parameters. This information includes press cycle command instructions, press cycle command segment parameters, servoloop instructions, servoloop parameters and DOF output sum instructions. Functions performed by press control CPU 52 include initialization and press cycle control.

The press cycle control program stored in memory 54 includes data characterizing the desired position and force characteristics of moving ram 14 as a function of an independent variable such as time. In particular, the desired press cycle is represented in terms of a number of separate but continuous segments generally describing the desired positions and forces of moving ram 14 as a function of time. Specific positions and forces of moving ram 14 about each segment (i.e. the servoloop input commands) are computed by moving ram control CPU 56 and power module control CPU 60. To enable these computations, press control CPU 52 provides command instructions and command segment parameters to CPUs 56 and 60. The command segment parameters are initial condition values required by CPUs 56 and 60 to compute s the specific (desired) positions and forces of moving ram 14 along the segment. These segment parameters can include ending positions and forces of the segment, ending velocities, and the time required for ram 14 to traverse the segment.

Command instructions provided by press control CPU 52 are used to control the manner in which moving ram control CPU 56 and power module control CPU 60 use the command segment parameters and information calculated from the segment parameters. Command instructions sent include the following:

| | |
|---|---|
| Load | Informs CPUs 56 or 60 that a new set of set of command segment parameters are available. |
| Start | Initiates servoloop input command generation. |
| Stop/Hold | Stops the servoloop input command generation. |
| Continue | Restarts servoloop input command generation. |
| Flush | Clears command segment parameters and cancels servoloop input command generation for the current segment. |
| Feedback Follow | Causes CPUs 56 or 60 to operate in |

| Mode | |
|---|---|
| | Feedback Follow Mode and generate servoloop input commands equal to current feedback parameters. |

As will be described in greater detail in subsequent portions of this description, moving ram control CPU 56 and power module control CPU 60 use digital servoloop operations to produce servoloop output commands. Press control CPU 52 controls the servoloop operations by sending appropriate servoloop instructions to CPUs 56 and 60.

Moving ram control CPU 56 and power module control CPU 60 calculate DOF output sums or servovalve commands as a function of various servoloop output commands. Press control CPU 52 sends DOF output sum instructions to CPUs 56 and 60 to control these calculations. Press control CPU 52 also controls the initialization of CPUs 56 and 60. Reset command instructions and servoloop instructions can be sent to CPUs 56 and 60 to initialize or reset their command generation and servoloop operations.

4. Communic terface CPU 44.

Feedback limit checking and servoloop tuning procedures are controlled by a program running in communication interface 44. Communications interface CPU 44 sends feedback limits to moving ram control CPU 56 and power module control CPU 60 during tuning procedures. Moving ram 14 has varying dynamic characteristics throughout the press cycle. To accommodate these changing characteristics servoloop gain parameters are determined for several positions of moving ram 14 during tuning procedures, and stored in RAM 61. Moving rams control CPU 56 can interpolate servoloop gain parameters for positions of moving ram 14 based on those at which the gain parameters were established durinq tuning. Communication interface CPU 44 carries out the tuning procedures by sending servoloop and command instructions to CPUs 56 and 60. Specifically, individual DOF servoloops can be isolated and commands characteristic of predetermined functions (e.g. sine, square, ramp or "move to" predetermined positions in predetermined times) applied thereto. Proper gain parameters can be obtained by monitoring the response of press 10 to the commands applied during tuning procedures.

5. Moving Ram Control CPU 56

The operation of moving ram control CPU 56 can be described with reference to FIG. 3. In response to handshake signals from A/D CPU 48 indicating that current sets of feedback parameters have been stored in memory 50, moving ram control CPU 56 calculates DOF feedback sums. This operation is indicated generally at 70. The DOF feedback sums calculated and utilized by moving ram control CPU 56 are described below in Table 2.

TABLE 2

| Moving Ram Control CPU DOF Feedback Sums | | |
|---|---|---|
| $V_{mr}$ | = | vertical position |
| $R_{mr}$ | = | roll position |
| $V_{fmr}$ | = | vertical load |
| $R_{fmr}$ | = | roll load |

The equations used to generate the moving ram DOF feedback sums described above are found below in Table 3.

TABLE 3

| Moving Ram Control CPU DOF Feedback Sum Equations | | | |
|---|---|---|---|
| $V_{mr}$ | = | $(X_a + X_b + X_c + X_d)/4$ | |
| $R_{mr}$ | = | $X_a + X_b - (X_c + X_d)$ | |
| $V_{fmr}$ | = | $(P_{Lab} + P_{Lcd}) A_L/2$ | where $A_L$ = area of Lift Cylinders 18AB, 18CD |
| $R_{fmr}$ | = | $(P_{Lab} - P_{Lcd}) A_L/2$ | |

After they are calculated, the DOF feedback sums are compared to predetermined feedback limits received from communication interface CPU 44. If the feedback sums differ from associated commands by an amount greater than the feedback limits, press control CPU 52 is notified. Under these conditions press control CPU 52 will perform an emergency stop. If the DOF feedback sums are within the feedback limits, they are assumed to be accurate and are stored in current value memory 50. The feedback limit checking operations are illustrated at 72 in FIG. 3. Feedback limit checking operations such as those illustrated at 72 can also be performed at servoloop operations 76,78, 80 and 81 discussed below.

For each DOF used to control ram lift cylinders 18AB and 18CD, moving ram CPU 56 digitally implements a servoloop operation. In the embodiment shown moving ram CPU 56 implements vertical load servoloop operation 76, vertical position servoloop operation 78, roll position servoloop operation 80 and roll load servoloop operation 81. In response to the command instructions, command segment parameters and feedback parameters received from press control CPU 52 and current value memory 50, moving ram control CPU 56 generates servoloop lnput commands for vertical load servoloop operation 76 and vertical position servoloop operation 78. The command generation operations are illustrated generally at 74. In the embodiment shown, CPU 56 generates vertical load commands and vertical position commands. These commands represent the desired vertical force or load and vertical position of moving ram 14 at a series of points along the path segments. In one embodiment these servoloop input commands are generated as a function of the commands segment parameters and command instructions in accordance with the method described in the Gutman et al. U.S. Pat. No. 4,794,540 Linear, cubic, sine or other functions can be used for this purpose. After the commands are generated at operation 74 they are stored in current value memory 50. Roll position and roll load servoloop operations 80 and 81 both receive servoloop input commands of zero (i.e., no roll) directly from press s control CPU 52.

Servoloop operations 76, 78, 80 and 81 run continuously and generate servoloop output commands as a function of associated DOF feedback sums and servoloop input commands. Following their calculation the output commands generated at servoloop operations 76, 78, 80 and 81 are stored in current value memory 50. The servoloop output commands generated at servoloop operations 76, 78, 80 and 81 are defined below in Table 4.

TABLE 4

| Moving Ram Servoloop Output Commands | | |
|---|---|---|
| $O_{Lvl}$ | = | output of lift vertical load servoloop 76 |

TABLE 4-continued

| Moving Ram Servoloop Output Commands | | |
|---|---|---|
| $O_{Lvp}$ | = | output of lift vertical position servoloop 78 |
| $O_{Lrp}$ | = | output of lift roll position servoloop 80 |
| $O_{Lrl}$ | = | output of lift roll load servoloop 81 |

Moving ram control CPU 56 calculates DOF output sums at operation 84 as a function of the servoloop output commands from servoloop operations 76, 78, 80 and 81. In response to Position Mode and Load Mode instructions received from press control CPU 52, moving ram control CPU 56 will select the servoloop output commands from either vertical load servoloop operation 76 or vertical position servoloop operation 78 for use by DOF output sum operation 84. The moving ram lift vertical mode select operation is illustrated generally at 82. Similarly, in response to Position Mode and Load Mode instructions received from press control CPU 52, moving ram control CPU 56 selects servoloop output commands from either roll position servoloop operation 80 or roll load servoloop operation 81 for use by DOF output sum operation 84. This mode selection operation is illustrated at 83. The servoloop output commands $O_{Lvl}$ or $O_{Lvp}$ and $O_{Lrp}$ or $O_{Lrl}$ selected at operations 82 or 83 and coupled to DOF output sum operation 84 are denoted $O_{Lv}$ and $O_{Lr}$, respectively, as indicated below in Table 5.

TABLE 5

| Selected Moving Ram Servoloop Output Commands | | |
|---|---|---|
| $O_{Lv}$ | = | ram vertical servoloop output commands selected at operation 82 |
| $O_{Lr}$ | = | ram roll servoloop output commands selected at operation 83 |

Calculation of the DOF output sums at Operation 84 reduces the DOF commands from servoloop operations 76, 78, 80 and 81 to servovalve commands for respective servovalves 22AB and 22CD. These servovalve commands are defined in accordance with the equations set out below in Table 6.

TABLE 6

| Moving Ram Servovalve Commands |
|---|
| $C_{Lab}$ = command to lift servovalve 22AB = $(O_{Lv} + O_{Lr})/2$ |
| $C_{Lcd}$ = command to lift servovalve 22CD = $(O_{Lv} - O_{Lr})/2$ |

After they have been calculated at operation 84, the DOF output sums are stored in current value memory 50. After being retrieved from memory 50 the DOF output sums are then converted to analog form by digital-to-analog conversion (DAC) operation 88 and applied to their corresponding servovalves 22AB and 22CD as servovalve commands. If the DOF output sums (digital servovalve commands) have corresponding analog servovalve commands which exceed the range of DAC operation 88, the analog servovalve commands will be clipped to the maximum or minimum servovalve command attainable by the DAC operation.

Figure 4:
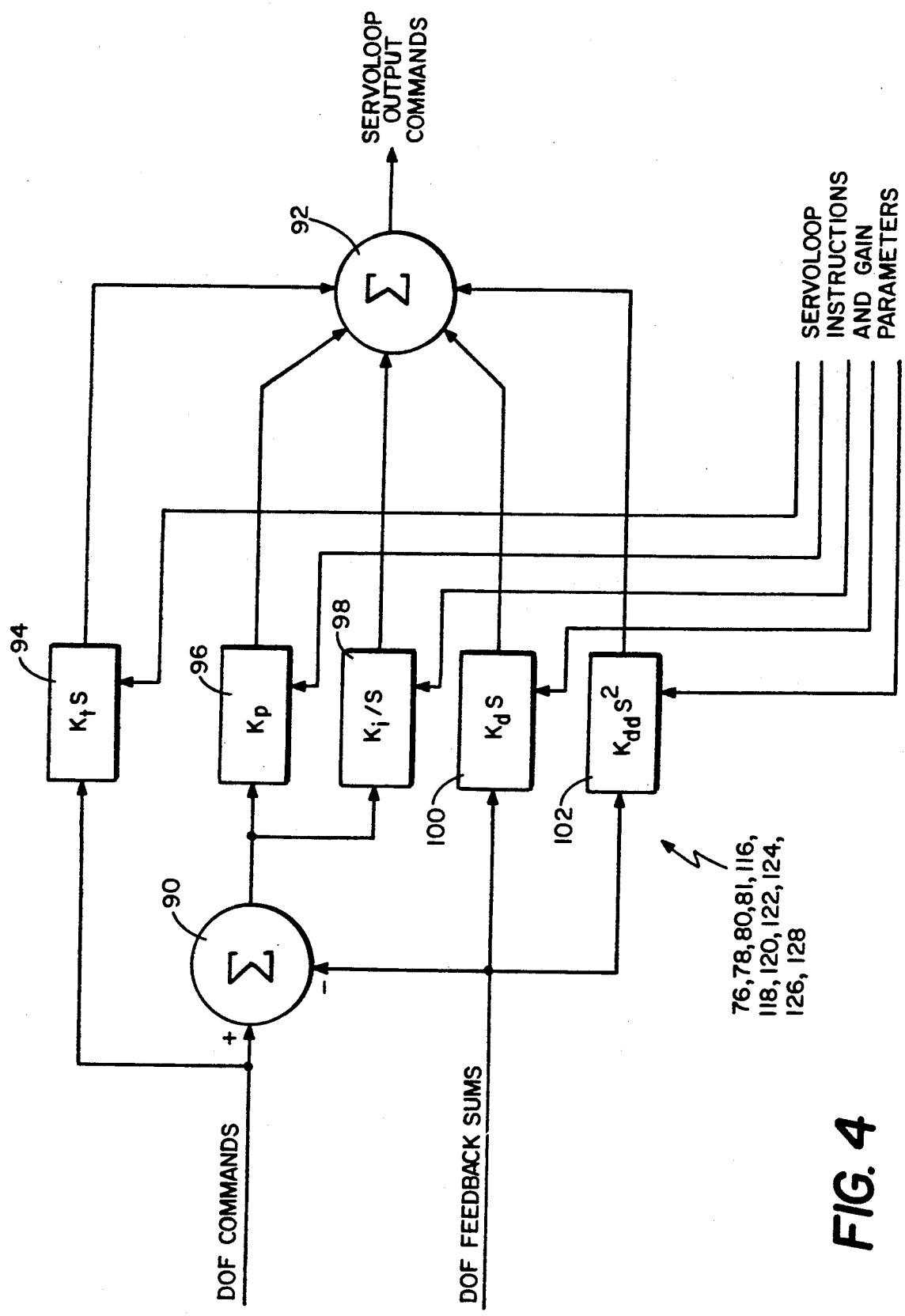
FIG. 4 is a detailed block diagram representation of the servoloop operations implemented by the moving ram control CPU and the power module s control CPU.

The implementation of servoloop operations 76, 78, 80 and 81 by moving ram control CPU 56, as well as servoloop operations yet to be described and implemented by power module control CPU 60, can be described generally with reference to FIG. 4. Each servoloop operation 76, 78, 80 and 81 receives its associated DOF servoloop input commands (e.g., those generated at operation 74 by CPU 56) and associated degree of freedom feedback sums (e.g., those calculated at operation 70 by CPU 56). The DOF servoloop input commands are representative of the desired or expected state of hydraulic press 10, while the DOF feedback sums are a measure of the current state of the hydraulic press. Corresponding DOF servoloop input commands and DOF feedback sums are applied to summing junction 90. Error values output summing junction 90 are representative of the errors or differences between the servoloop input commands and feedback sums. The error values can be used as a servoloop performance measurement.

The error values generated at summing junction 90 as well as the corresponding servoloop input commands and feedback sums are subjected to compensation operations 94, 96, 98, 100 and/or 102 before being summed at summing junction 92 to generate the servoloop output commands. Servoloop gain parameters $K_t$, $K_p$, $K_i$, $K_d$ and $K_{dd}$ are received from communication interface CPU 44. Servoloop instructions controlling compensation operations 94–102 for each servoloop operation of moving ram control CPU 56 are received from press control CPU 52. Each servoloop operation 76, 78, 80 and 81 can receive different gain parameters $K_t$, $K_p$, $K_d$ and/or $K_{dd}$. Moving ram control CPU 56 calculates the gain parameter on every update, based on the vertical position.

Compensation operation 94 is a tracking compensation which helps control system 12 follow (track) changes in DOF servoloop commands. Tracking gain parameter $K_t$ is the rate at which the servoloop input commands are changing. The DOF servoloop input commands are therefore differentiated and multiplied by tracking gain parameter $K_t$ to "anticipate" changes in commands.

The error values generated at summing junction 90 are multiplied by proportional gain parameter $K_9$ at compensation operation 96 and integrated and multiplied by integration gain parameter $K_i$ at compensation operation 98. The multiplication of the error values by proportional gain parameter $K_p$ is common in closed servoloop operations such as 76, 78, 80 and 81. Integration gain parameter $K_i$ is used to eliminate any offsets which might otherwise be present in the mechanical system of hydraulic press 10 or its electrical control system 12. The offsets which are eliminated by compensation operation 98 commonly show up as steady state errors. When hydraulic press 10 is commanded by control system 12 to maintain a given state, integration compensation operation 98 should attain a value (by integrating the steady-state error) that minimizes the effect of any system offsets. Since integration compensation 98 is normally used to correct steady-state errors its output should remain constant while servoloop input commands are changing. The level of integration compensation 98 will only change if all of the following conditions are met:

1. The DOF servoloop input command has not changed for four consecutive updates (i.e. the command is steady-state); and 2. The output level of integration compensation 98 is below a predefined level. This keeps the output of integration compensation 98 from "running away". If the error output value at the output of summing junction 98 is opposite in sign from the output of integration compensation 98, it is added at summing junction 92 regardless of its level. It will be clipped, if s necessary.

Rate control compensation operation 100 helps to reduce any oscillations and overshoot which might otherwise occur in hydraulic press 10. Rate control compensation operation 100 is implemented by taking the derivative of the DOF feedback sum and multiplying it by rate gain parameter $K_d$.

Acceleration control compensation operation 102 also helps reduce oscillations and overshoot in hydraulic press 10. Acceleration control compensation operation 102 is used only for ram vertical position servoloop operation 78 and ram roll position servoloop operation 80. For other servoloops (e.g. ram load servoloop 78 and roll load servoloop 80 of CPU 56) press control CPU 52 sends servoloop instructions which prevent the use of acceleration control compensation operation 102. Feedback parameters $P_{Lab}$ and $P_{Lcd}$ are proportional to the acceleration.

As shown in FIG. 4, the outputs of compensation operations 94, 96, 98, 100 and 102 are summed by summing junction 92. The resulting servoloop output is a scaled value which can be summed with other DOF output sums (e.g. at 84 by moving ram control CPU 56) to produce the output commands.

Figure 3:
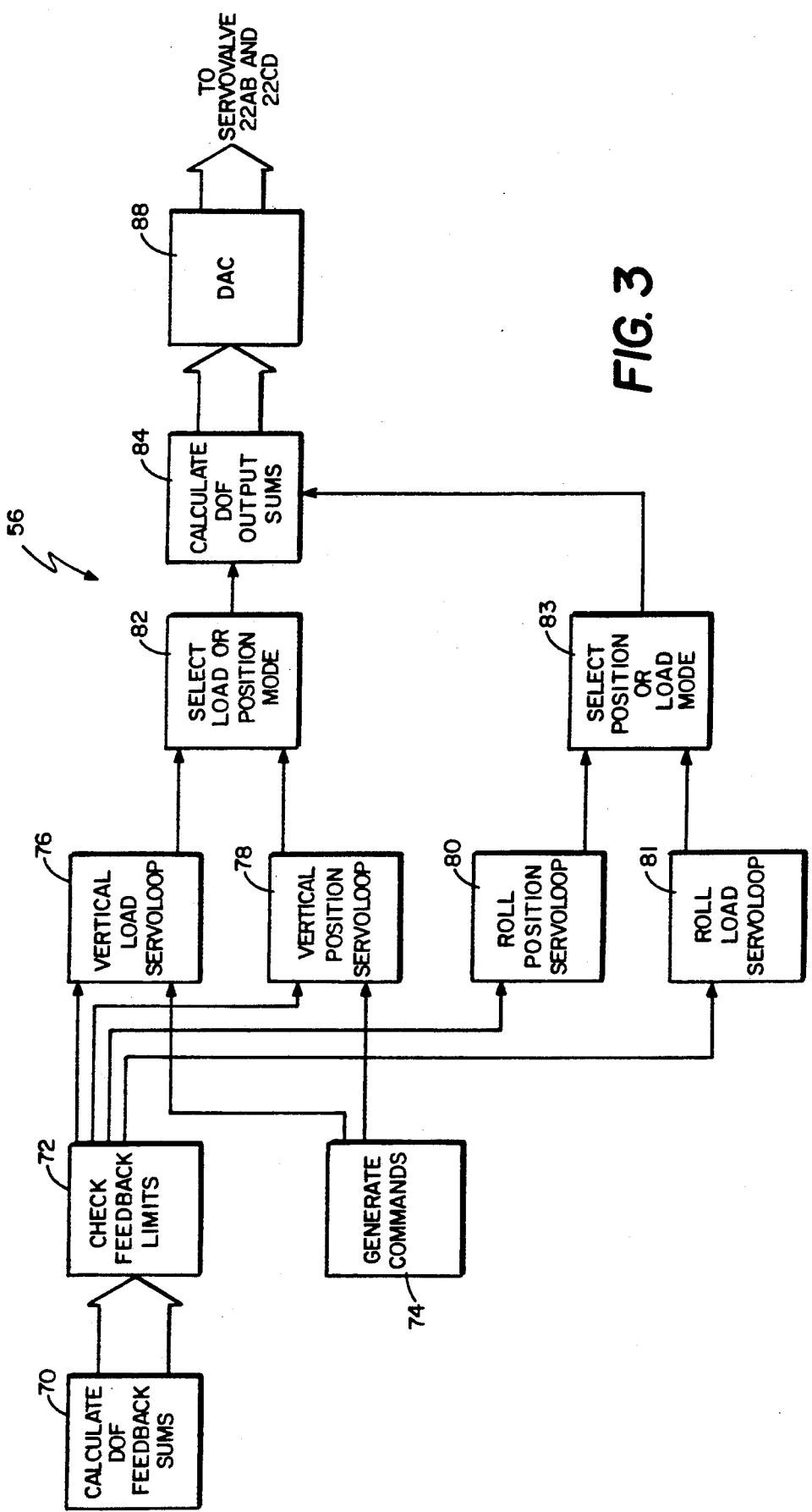
FIG. 3 is a detailed block diagram representation of the operations implemented by the moving ram control CPU shown in FIG. 1.

Referring back to the operation of moving ram control CPU 56 shown in FIG. 3, ram vertical position servoloop operation 78 is used to control moving ram cylinders 18AB and 18CD. Servoloop operation 78 must be capable of moving ram 14 very quickly. There can be no overshoot during pressing (lowering). Small tracking errors (difference between changes in command and response of press 10) are acceptable and expected.

Ram vertical load servoloop operation 78 is used to control lift cylinders 18AB and 18CD and to keep them charged when clamps 30A-30D are on. The associated servoloop input command should be a static level which will keep cylinders 18AB, 18CD from discharging their fluid, while minimizing forces which would operate against forces generated by power module cylinders 32A-32D. The servoloop output commands of servoloop operation 76 are interchanged with servoloop output commands from lift vertical position servoloop operation 78 by mode select operation 82. While clamps 30A-30D are on, output commands of roll position servoloop operation 80 are not used by DOF output sum operation 84.

Lift roll position servoloop operation 80 and roll load servoloop operation 81 always receive static servoloop input commands equal to zero (i.e. function as a regulators). The maximum roll is determined by characteristics of press 10. If the roll gets too large, ram 14 will not move smoothly. Roll position servoloop operation 80 seeks to minimize the roll, giving a smoother vertical stroke.

6. Power Module Control CPU 60

Figure 5:
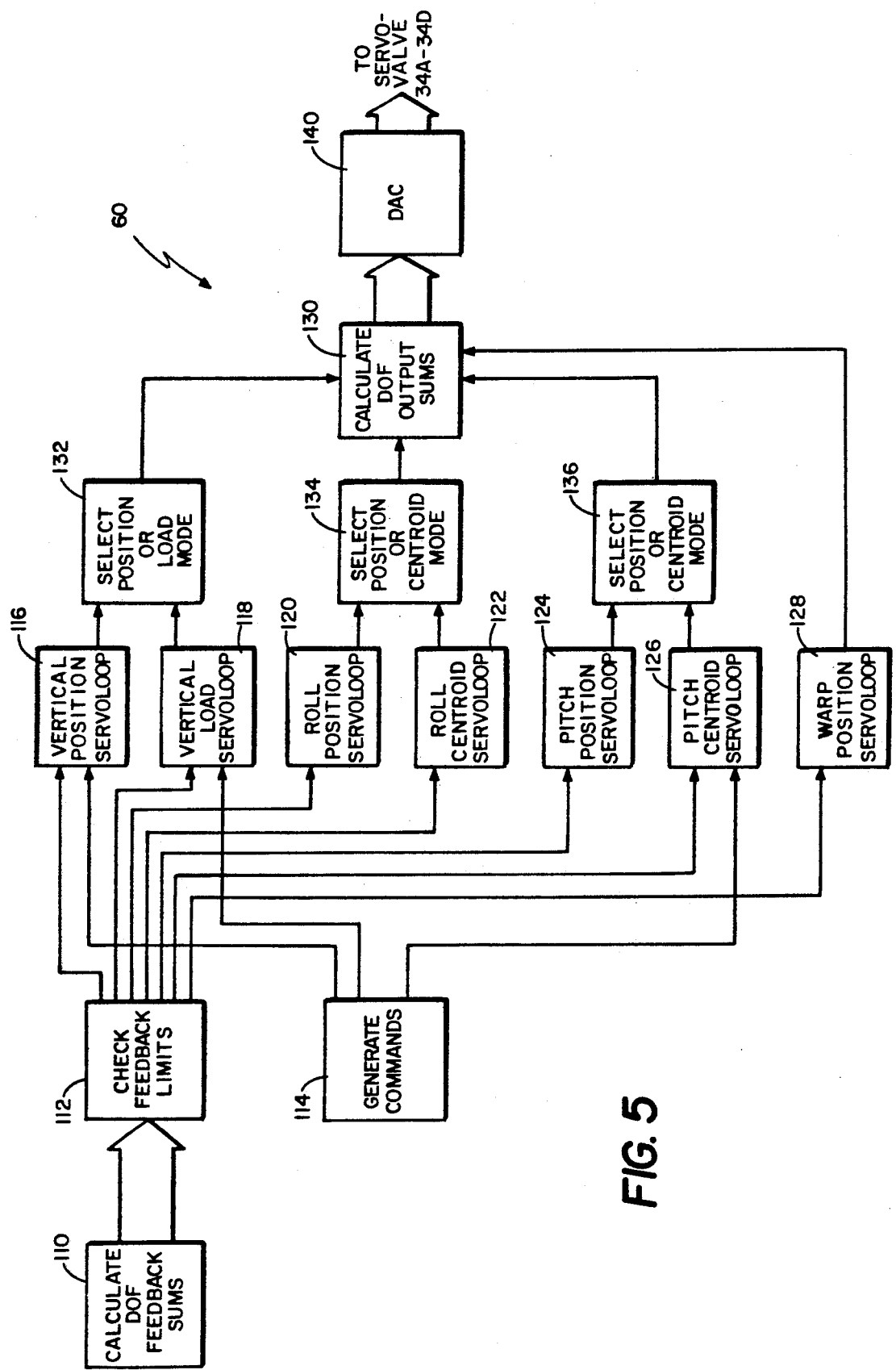
FIG. 5 is a detailed block diagram representation of the operations implemented by the power module control CPU.

The operation of power module control CPU 60 and its interrelationship to A/D CPU 48 and press control CPU 52 can be described with reference to FIG. 5. Although the DOF control functions implemented by CPU 60 differ from those implemented by moving ram control CPU 56, the power module control CPU implements its functions in a manner similar to that of the moving ram control CPU. The DOF feedback sums are calculated at operation 110 as a function of feedback parameters stored in current value memory 50. The feedback sums are checked against predetermined limit values provided by communication interface CPU 44 at operation 112 (or at the respective servoloop operations), and stored in current value memory 50. Power module control CPU 60 is digitally implements a power module vertical position servoloop operation 116, vertical load servoloop operation 118, roll position servoloop operation 120, roll centroid servoloop operation 122, pitch position servoloop operation 124, pitch centroid servoloop operation 126, and warp position servoloop operation 128. Servoloop operations 116, 118 and 126 Continuously generate servoloop output commands as a function of associated DOF feedback sums and servoloop input commands generated at operation 114. The commands are generated as a function of command instructions and command segment parameters, received from press control CPU 52, in the manner described above with reference to command generation operation 74 of moving ram control CPU 56. Servoloop operations 120, 122, 124 and 128 all receive servoloop input commands equal to zero, and generate servoloop output commands as a function of the input commands and associated DOF feedback sums calculated at operation 110. In response to Position Mode, Load Mode or Centroid Mode instructions, the servoloop output commands from one of either vertical position servoloop operation 116 or vertical load servoloop operation 118, roll position servoloop operation 120 or roll centroid servoloop operation 122, and pitch position servoloop operation 124 or pitch centroid servoloop operation 126, are used for purposes of Calculating DOF output sums at 130. The mode select operations are illustrated at 132, 134 and 136 in FIG. 5. The DOF output sums are then converted to analog form by DAC operation 140, and output to servovalves 34A-34D as servovalve commands. In response, power modules 28A-28D drive moving ram 14 with respect to base 20 in accordance with the cycle control program stored in memory 54 of press control CPU 52.

The DOF feedback sums calculated by CPU 60 at operation 110 are specified below in Table 6.

TABLE 6

| Power Module DOF Feedback Sums | | |
|---|---|---|
| $V_{px}$ | = | vertical position |
| $V_f$ | = | vertical load |
| $R_x$ | = | roll position |
| $R_c$ | = | roll centroid |
| $P_x$ | = | pitch position |
| $P_c$ | = | pitch centroid |
| $W_x$ | = | warp position |

The equations used by power module control CPU 60 to implement DOF feedback sum operation 110 are described below in Table 7.

TABLE 7

$V_{px} = (X_a + X_b + X_c + X_d)/4$ $V_f = ((P_{pa} + P_{pb} + P_{pc} + P_{pd})A_p) - ((P_{sa} + P_{sb} + P_{sc} + P_{sd})A_s)$
where: $A_p$ = area of pressing Power Module Cylinders 32A-32D
$A_s$ = area of stripping Power Module Cylinders 32A-32D $R_x = X_a + X_b - (X_c + X_d)$ $R_c = (((P_{pa} + P_{pb} - (P_{pc} + P_{pd}))A_p) + ((P_{sc} + P_{sd} - (P_{sa} + P_{sb}))A_s))r_1/V_f$
where: $r_1$ = distance from roll axis r to center of Cylinder 32B or 32C $P_x = X_a + X_d - (X_b + X_c)$ $P_c = (((P_{pa} + P_{pd} - (P_{pb} + P_{pc}))A_p) + ((P_{sb} + P_{sc} - (P_{sa} + P_{sd}))A_s))r_2/V_f$
where: $r_2$ = distance from pitch axis p to center of Cylinder 32B or 32C

TABLE 7-continued $W_x = X_a + X_c - X_b - X_d$

Power module vertical position servoloop operation 116 must operate without overshoot. A slight tracking error is acceptable. Vertical load servoloop operation 118 should be configured (receive appropriate gain compensation parameters) to produce minimum amounts of force overshoot. A small tracking error is acceptable from vertical load servoloop operation 118.

Roll position servoloop operation 120 receives static servoloop input commands of zero during normal operation. It should keep roll errors to a minimum. Roll centroid servoloop operation 122 also receives a static input servoloop command of zero during normal operation.

Pitch position servoloop operation 124 operates as a regulator with a zero input command under normal operation. Errors should be kept to a minimum. Pitch centroid servoloop operation 126 also operates as a regulator under most conditions.

Warp position servoloop operation 128 is typically operated as a regulator. In one embodiment none of servoloop operations 116, 118, 120, 122, 124, 126 or 128 use acceleration compensation operation 102 (FIG. 4).

As stated above, power module control CPU 60 makes use of servoloop output commands from only one of servoloop operation pairs 116 and 118, 120 and 122 and 124 and 126 at any given time while calculating DOF output sums at operation 130. The designation of the selected servoloop output commands is specified below in Table 8.

TABLE 8

Selected Power Module Servoloop Output Commands

- $O_v$ = vertical servoloop output commands selected at operation 132
- $O_r$ = roll servoloop output commands selected at operation 134
- $O_p$ = pitch servoloop output commands selected at operation 136

The output commands of warp position servoloop 128 are designated below in Table 9.

TABLE 9

$O_w$ = output commands from warp position servoloop 128

DOF output sums are calculated at Operation 130 as a function of the selected vertical, roll and pitch servoloop output commands and the output commands of warp position servoloop operation 128. DOF output sums computed at operation 130 are specified below in Table and defined in terms of the servoloop output commands Table 11.

TABLE 10

| Power Module Servovalve Commands | | |
|---|---|---|
| $C_a$ | = | command to Servovalve 34A |
| $C_b$ | = | command to Servovalve 34B |
| $C_c$ | = | command to Servovalve 34C |
| $C_d$ | = | command to Servovalve 34D |

TABLE 11

| Power Module Servovalve Commands | | |
|---|---|---|
| $C_a$ | = | $(O_v + O_p + O_r + O_w)/4$ |
| $C_b$ | = | $(O_v + O_r - (O_p + O_w))/4$ |
| $C_c$ | = | $(O_v + O_w - (O_p + O_r))/4$ |

TABLE 11-continued

| Power Module Servovalve Commands | | |
|---|---|---|
| $C_d$ | = | $(O_v + O_p - (O_r + O_w))/4$ |

The digital servovalve commands calculated at DOF s output sum operation 130 are converted to analog form by digital-to-analog conversion operation 140 before being applied to respective servovalves 34A-34D. If any of the servovalve commands exceed the limits of DAC operation 140, they are clipped.

7. Press Cycle

The operation of hydraulic press 10 and control system 12 can be described with reference to FIG. 6 in which the mold parting distance (distance between mold sections 24 and 26) for a complete press cycle is illustrated as a function of time. As shown, the press cycle includes fast advance stroke 150, clamps-on stroke 151, pressing and cure stroke 152, coating injection stroke 154, coating pressing stroke 156, stripping stroke 158 and fast open stroke 160. Data characterizing the press cycle and associated control parameters is stored in memory 54 during mold setup procedures. Throughout this description, the term "active" is used to describe a servoloop operation which has its output commands selected by the associated mode select operation for use by the associated DOF output sum operation. An "inactive" servoloop is one for which the servoloop output commands have not been selected. Similarly, the terms "position mode" "load mode" and "centroid mode" designate the servoloop output commands which are selected. By way of example, when mode select operation 132 selects output commands from vertical load servoloop operation 118, power module CPU 60 is operating in vertical load mode with the vertical load servoloop operation active and vertical position servoloop operation 116 inactive. Inactive or unselected servoloop operations are, however, continuously generating servoloop output commands.

The press cycle begins with moving ram 14 positioned at a predefined home position at which mold sections 24 and 26 are at their greatest parting distance. Lift vertical position servoloop operation 78 is active to maintain moving ram 14 at the home position. Lift roll position servoloop operation 80 is active and receiving static input commands of zero. Power module vertical load servoloop operation 118 is active and receives a static command which keeps the power module against stops (not shown) at the top of its stroke. All other servoloop operations 76, 116, 120, 122, 124, 126 and 128 are inactive.

The initial motion of moving ram 14 during its press cycle is characterized by fast advance stroke 150. In one embodiment moving ram 14 moves through a thirty-six inch stroke with constant acceleration and deceleration in 2.1 seconds during fast advance stroke 150. During this stroke lift vertical position servoloop operation 78 is active. The commands to servoloop operation 78 are generated at command generation operation 74 in response to command instructions and command segment parameters received by moving ram control CPU 56 from press control CPU 52. Lift roll position servoloop operation 80 is also active and receives an input command of zero. Power module vertical load servoloop operation 118 receives static commands from command generation operation 114 which keep power module 28 against the stops on top of its stroke. All other servoloop operations 76, 116, 120. 122, 124, 126 and 128 are inactive during fast advance stroke 150.

While moving ram 14 is decelerating at the end of fast advance stroke 150, clamps 30A-30D are activated in response to signals sent by control system 12 (e.g. by press control CPU 52). The mechanical clamping action of clamps 30A-30D takes a finite amount of time, and all clamps do not clamp simultaneously. Clamps 30A-30D must also be activated while ram 14 is moving. Control system 12 must therefore maintain parallelism of ram 14 during clamps-on stroke 151.

Several numbers or constants including pressing position PP, pressing velocity PV, clamp time CT and ram position tolerance TOL are used during clamps-on stroke 151. Pressing position PP is the vertical position at which ram 14 is completely clamped and traveling at the pressing velocity. Power module control CPU 60 is in control of the pressing process by the time moving ram 14 reaches pressing position PP. Pressing position PP is entered by the operator during mold setup.

Pressing velocity PV is the velocity of moving ram 14 when it reaches pressing position PP. This velocity is also entered by the operator during mold setup.

Clamp time CT is a measure of the time that elapses between the sending of the clamps-on signals and the physical clamping action of clamps 30A-30D in response thereto. In one embodiment a clamp time CT of 0.2 second is used.

When moving ram 14 is commanded to a specific vertical position, it will not be exactly at the commanded position because of inherent properties of control systems such as 12. Moving ram position tolerance TOL is an "error window" within which moving ram 14 can be positioned and still considered to be at the commanded position. In one embodiment ram position tolerance TOL is on the order of 0.10 inch. Ram position tolerance TOL and clamp time CT are stored in memory.

The clamps-on position COP of moving ram 14 at which the clamps-on signal is sent from control system 12 to clamps 30A-30D is calculated as a function of the above-described constants in accordance with the equation in Table 12 below.

TABLE 12

| COP | = | PP + (PV × CT) + TOL |
|---|---|---|

As moving ram 14 is driven downwardly, it is commanded to decelerate to pressing velocity PV by the time it reaches the clamps-on position COP. After it decelerates to pressing velocity PV, moving ram 14 is commanded to close at a constant velocity (the pressing velocity) for the remainder of pressing stroke 152. Prior to clamps-on stroke 151, power module control CPU 60 is operated in its vertical load mode, with vertical load servoloop operation 118 receiving servoloop input commands for a full strip. These input commands result in power modules 28A-28D being driven to the top of their strokes. When moving ram 14 reaches clamps-on position COP, control system 12 sends signals to activate clamps 30A-30D. Power module control CPU 60 switches to position mode at this time, and activates pitch position servoloop operation 124, roll position servoloop operation 120, vertical position servroloop operation 116 and warp position servoloop operation 128. Servoloop input commands to vertical position servoloop operation 116 are the same as those provided to vertical position servoloop operation 78 of press control CPU 52 (i.e. close at the pressing velocity). Although clamps-on signals have been sent at this point, clamps 30A-30D are not yet clamped or active. Moving ram control CPU 56 is closing ram 14 at pressing velocity PV. Power module control CPU 60 operates under the assumption that clamps 30A-30D are on, and is in position control. Servoloop operations 116, 120, 124 and 128 of power module control CPU 60 are all active at this point in clamps-on stroke 151.

Vertical position servoloop operation 116 is the most important servoloop operating during Clamps-On stage 151. Because vertical position feedback parameters of moving ram 14 are the same as the power modules command (best case), vertical position servoloop operation 116 will command power modules 28A-28D to remain at their current position. When clamps 30A-30D are activated, power modules 28A-28D start down at the commanded rate, with little disturbance in the pressing profile.

Assuming that the vertical command of the power modules lags the position feedback parameters of moving ram 14, vertical position servoloop operation 116 will command power modules 28A-28D to travel upwardly. In this case, when clamps 30A-30D are activated, ram 14 will stop until the power module's command catches up with its feedback.

If the vertical command of the power modules leads the position feedback of the moving ram, power module vertical position servoloop operation 116 will command power modules 28A-28D to go down slowly. In this case there is little disturbance in the pressing profile, but a small amount of the pressing stroke is used up. In one embodiment the vertical position servoloop commands of power module control CPU 60 are very close to the vertical position commands of moving ram control CPU 56 and the position feedback parameters. In this embodiment there is little disturbance in the pressing profile and only a small portion (less than 0.1 inch) of the pressing stroke is used up.

Power module roll position servoloop operation 120 is also active during clamps-on stroke 151, and receives servoloop input commands of zero. Any error in the roll position will cause power module control CPU 60 to correct this error. A roll error will cause the power module roll position servoloop operation 120 to command two of power modules 28A-28D to go up and the other two power modules to go down. Because power modules 28A-28D are already at the top of their stroke, a command causing the power module to go up results in a slight disturbance in the pressing profile when clamps 30A-30A come on. The command to power modules 28A-28D to go down will cause the power modules to slowly start down.

The amount of disturbance due to the roll error will depend upon the magnitude of the roll error. Roll position servoloop operation 80 of moving ram control CPU 56 controls the roll position of ram 14 with sufficient accuracy to ensure that the error will be slight. If, because of some mechanical reason, the roll becomes more excessive, the disturbance during clamps-on stroke 151 will increase.

If clamp time CT is long, the roll error can be amplified. Since clamp time CT is short in preferred embodiments, the roll error adds little disturbance to the clamping process. Also, if the roll error is excessive prior to the clamping, it can be almost impossible to correct without position feedback from power modules 28A–28D when they are unclamped.

Moving ram control CPU 56 does not have control over pitch errors in the above-described embodiment of press 10 and control system 12. Any error in the pitch will be corrected by power module control CPU 60. Pitch position servoloop operation 124 will command two of power modules 28A–28D to go up and the other two to go down. Because the power modules are already at the top of their stroke, a command to go up results in a slight disturbance in the pressing profile when clamps 30A–30D are activated. A command causing power modules 28A–28B to go down will cause the power modules to slowly start down.

The amount of disturbance in the pressing profile due to pitch errors depends on the magnitude of the pitch errors. If for some mechanical reason the pitch error is excessive, the disturbance to clamps-on stroke 151 will increase. If clamp time CT is long, this pitch error will also be amplified. If the pitch error is excessive prior to the activation of clamps 30A–30D, it can be almost impossible to correct this error without position feedback from power modules 28A–28D when they are unclamped.

Power module warp position servoloop operation 128 is also active during clamps-on stroke 151. Warp position servoloop operation 128 is similar to that of pitch position servoloop operation 124 described above in that moving ram control CPU 56 does not have control over warp error. Any error in the warp is therefore corrected by power modules 28A–28D in response to commands from power module control CPU 60. However, warp errors will be small when press 10 is not loaded.

After clamps 30A–30D are on, power module control CPU 60 continues to close hydraulic press 10 in the position control mode. The vertical position is commanded to follow the pressing profile. Like power module control CPU 60 described below, moving ram control CPU 56 switches from position mode to load mode control when a predefined load is reached.

After clamps 30A–30CD are on, pressing and cure stroke 152 is initiated. Stroke 152 begins with a mode switch from power module vertical load servoloop operation 118 to power module vertical position servoloop operation 116. Input commands to vertical position servoloop operation 116 are those defined during mold setup. Input commands to roll position servoloop operation 120 and pitch position servoloop operation 124 are static values. As described above, roll, pitch and warp position sevoloop operations 120, 124 and 128, respectively, were active during clamps-on stroke 151. They remain active during stroke 152.

At the beginning of pressing and cure stroke 152, moving ram control CPU 56 is instructed to switch to lift vertical position control. Lift vertical load servoloop 78 is operated in its Feedback Follow Mode during this time, receiving servoloop input commands equal to position feedback parameters. Lift vertical load servoloop 76 is active after clamps 30A–30D are on and the predefined load is reached.

Power module roll centroid servoloop operation 122 and pitch centroid servoloop operation 124 are initially inactive during pressing stroke 152. When sensed vertical forces feedback parameter $V_f$ reaches a predetermined level, servoloops 122 and 126 can be activated if required. Use of roll centroid servoloop operation 122 and pitch centroid servoloop operation 126 are specified during mold setup. Warp position servoloop operation 128 is active with a static command of zero during pressing stroke 152.

Coating injection stroke 154 can be performed using either high or low pressure techniques. A low pressure coating injection stroke 154 involves parting mold sections between 0.1 and 0.9 inches in approximately 0.3 seconds. The coating is then injected and mold sections 24 and 26 closed to cure tonnage in approximately 0.3 seconds. Power module vertical load servoloop operation 118 is active before mold sections 24 and 26 are parted for coating injection. A mode switch to power module vertical position control is necessary prior to this mold parting. Mold sections 24 and 26 are parted and closed with vertical position servoloop operation 116 active. After mold sections 24 ls and 26 are closed, power module control CPU 60 is switched to load control mode.

High pressure injection coating operations during coating injection stroke 154 require a reduction of the pressing force between mold sections 24 and 26 to a predefined level in 0.1 second, coating injection and the closing of the mold sections to cure tonnage in 0.1 second. Power module control CPU 60 will typically be operating in vertical load mode prior to opening for coating injection and will remain in this mode for the entire coating injection stroke 154.

During coating injection stroke 154 using both high pressure and low pressure techniques, lift vertical load servoloop operation 76 and roll load servoloop operation 81 are active with static input commands. Whether or not mold sections 24 and 26 were closed with power module roll centroid servoloop operation 122 and pitch centroid servoloop operation 126 active, roll position servoloop operation 120 and pitch position servoloop operation 124 will be active while the mold sections are opened and closed during coating injection stroke 154. For the high pressure technique, the input commands to servoloop operations 120 and 124 remain the same as they were during the curing portion of pressing stroke 152. Power module warp position servoloop 128 is also active and receives a static command of zero during coating injection stroke 154.

The cycle of hydraulic press 10 continues with coating pressing stroke 156. Moving ram control CPU 56 is operated with vertical load servoloop operation 76 and roll load servoloop operation 81 active. Lift vertical position servoloop 78 and lift roll position servoloop 80 are inactive.

Power module control CPU 60 is operated with vertical load servoloop operation 118 active. If press 10 was opened for a low pressure coating injection during stroke 154, a mode switch from vertical position servoloop operation 116 to vertical load servoloop operation 118 is necessary after mold sections 24 and 26 are closed. When the vertical pressing force reaches a predetermined level, roll centroid servoloop operation 122 can be activated, if required. Pitch centroid servoloop operation 126 can also be activated when the pressing force reaches a predetermined level. Roll centroid servoloop operation 122 and pitch centroid servoloop operation 126 can receive static commands which cause a spreading of the coating over the part. Similarly, roll position servoloop operation 120 and pitch position servoloop operation 124 can receive static commands. Warp position servoloop operation 128 is also active during coating pressing stroke 156, and receives a static command of zero.

Stripping stroke 158 involves opening mold sections 24 and 26 by a distance of approximately one inch in 2.0 seconds. Moving ram control CPU 56 is operated with vertical load servoloop operation 76 and roll load servoloop operation 81 active to assist in the stripping. Vertical position servoloop operation 78 and roll position servoloop operation 80 are not used.

At the beginning of stripping stroke 158 power module control CPU 60 undergoes a mode switch from vertical load servoloop operation 11B to vertical position servoloop operation 116. Power module control CPU 60 is also operated with roll position servoloop operation 120 and pitch position servoloop operation 124 during stripping stroke 158. Roll position servoloop operation 120 receives a static command which is determined by reading roll feedback parameter R at the end of coating pressing stroke 156. A static command determined by reading pitch position feedback parameter $P_x$ at the end of coating pressing stroke 156 is applied to pitch position servoloop operation 124. Warp position servoloop operation 128 is active with a static command of zero. All other servoloops are inactive.

The press cycle ends with fast open stroke 160. Following the completion of stripping stroke 158 clamps 30AB and 30CD are released. Moving ram 14 is driven over its thirty-six inch stroke in approximately 2.5 seconds. Moving ram cylinders 18AB and 18CD must be charged and ready to open when clamps 30A–30D are released. Power modules 28A–28D are commanded to their "standby" positions against the top of their stroke.

During fast open stroke 160 moving ram control CPU 56 undergoes a mode switch and operates with vertical position servoloop operation 78 and roll position servoloop operation 80. Power module control CPU 60 is operated with vertical load servoloop operation 118 which receives a static command to keep the base against the stops at the top of its stroke. All other servoloops are inactive.

8. Conclusion

The digital press control system of the present invention is accurate and reliable. Due to its modular design it is also versatile, and can be easily adapted to a variety of different presses and different applications using hydraulic presses. It can also be easily tuned.

Although the present invention has been described with reference to preferred embodiments, workers skilled in the art will recognize that changes may be made in form and detail without departing from the spirit and scope of the invention.

What is claimed is:

1. A digital computer based degree of freedom (DOF) control system for driving a movable member about a plurality of degrees of freedom as a function of a preestablished motion control program, including:
   actuators responsive to actuator commands for driving the movable member at a plurality of spaced driving locations;
   feedback means for providing: digital position feedback data representative of positions of the movable member at the spaced driving locations; and digital load feedback data representative of loads on the moving member at the spaced driving locations;
   memory means for storing data including the position feedback data, load feedback data, and data representative of the preestablished motion control program; and
   digital control computer means coupled to the actuators, feedback means, and memory means for generating the actuator commands as a function of the position feedback data, the load feedback data and the preestablished motion control program, the digital control computer means including:
   DOF feedback sum means for computing position DOF feeback sums, load DOF feedback sums and centroid DOF feedback sums as a function of the position feedback data and load feedback data;
   command generator means for computing servoloop input commands including, position servoloop commands, load servoloop input commands and centroid servoloop input commands as functions of the preestablished motion control program;
   DOF servoloop means for computing servoloop output commands including, position servoloop output command, load servoloop output commands and centroid servoloop output commands as functions of associated DOF feedback sums and servoloop commands;
   mode select means for selecting servoloop output commands from among the position servoloop output commands, the load servoloop output commands and the centroid servoloop output commands as a function of the motion control program; and
   DOF output sum means for computing the actuator commands as a function of the selected servoloop output commands.

2. The control system of claim 1 wherein:
   the feedback means includes digital feedback computer means for providing:
   periodically generated sets of position feedback data dn load feedback data; and
   generation of the sets of position feedback data and load feedback data; and
   the digital control computer means generates the actuator commands as a function of the handshake signals.

3. The control system of claim 2 wherein the DOF feedback sum means of the digital control computer means computes position DOF feedback sums, load DOF feedback sums and centroid DOF feedback sums in response to the handshake signals.

4. The control system of claim 1 wherein:
   the memory means includes current value memory for storing:
   the digital position feedback data and load feedback data provided by the feedback means;
   the position, load and centroid DOF feedback sums computed by the DOF feedback sum means;
   the position, load and centroid servoloop input commands computed by the command generator means;
   the position load and centroid servoloop output commands computed by the DOF servoloop means;
   the DOF feedback sum means includes means for accessing the current value memory to obtain position and load feedback data, and means for storing the computed DOF feedback sums in the current value memory;
   the DOF servoloop means includes means for accessing the current value memory to obtain the servoloop commands and DOF feedback sums, and means for storing the computed servoloop output commands in the current value memory; and the DOF output sum means includes means for accessing the current value memory to obtain the DOF servoloop output commands, and means for storing the computed actuator commands in the current value memory.

5. The control system of claim 4 wherein:
the actuators are responsive to analog actuator commands; and
the digital control computer means further includes digital-to-analog converter means for accessing the current value memory to obtain the digital actuator commands and for generating analog output commands as a function of the accessed commands.

6. The control system of claim 1 wherein:
the memory means includes means for storing DOF feeback sum limit data; and
the digital control computer means further includes DOF feedback sum limit checking means for comparing the computed DOF feedback sums to the stored DOF feedback sum limit data.

7. The control system of claim 1 wherein:
the actuators include:
 moving ram actuators responsive to moving ram actuator commands; and
 power module actuators responsive to power module actuator commands; and
the digital control computer means includes:
 moving ram control computer means for generating the movign ram actuator commands;
 power module control computer means for generating the power module actuator commands; and
 press control computer means coupled to the memory means for controlling the moving ram control computer means and power module control computer means as a function of the motion control program.

8. The control system of claim 7 wherein the moving ram control computer means includes:
moving ram DOF feedback sum means for computing position DOF feedback sums and load DOF feedback sums as a function of the position feedback data and load feedback data;
moving ram command generator means for computing position servoloop input commands and load servoloop input commands as a function of the motion control program;
moving ram DOF servoloop means for computing position servoloop output commands and load servoloop output commands as a function of associated DOF feedback sums and servoloop input commands;
moving ram mode select means for selecting position servoloop output commands and load servoloop output commands as a function of the motion control program; and
moving ram DOF output sum means for computing the moving ram actuator commands as a function of the selected position and load servoloop output commands.

9. The control system of claim 8 wherein:
the moving ram DOF servoloop means includes:
 vertical load servoloop operation means;
 vertical position servoloop operation means;
 roll position servoloop operation means; and
 roll load servoloop operation means; and
the moving ram mode select means includes:
 vertical mode select means for selecting output commands from either the vertical load servoloop operation means or the vertical position servoloop operation means, and means for coupling the selected servoloop output commands to the moving ram DOF output sum means; and
 roll mode select means for selecting servoloop output commands from either the roll position servoloop operation means or the roll load servoloop operation means, and means for coupling the selected servoloop output commands to the moving ram DOF output sum means.

10. The control system of claim 7 wherein the power module control computer means includse:
power module DOF feedback sum means for computing position DOF feedback sums, load DOF feedback sums and centroid DOF feedback sums as a function of the position feedback data and load feedback data;
power module command generator means for computing position servoloop input commands, load servoloop input commands and centroid servoloop input commands as a function of the motion control program;
power module DOF servoloop means for computing position servoloop output commands, load servoloop output commands and centroid servoloop output commands as a function of the associated DOF feedback sums and servoloop unit commands;
power module select means for selecting position servoloop output commands, load servoloop output commands and centroid servoloop output commands as a function of the motion control program; and
power module DOF output sum means for computing the power module actuator commands as a function of the selected position, load and centroid servoloop output commands.

11. The control system of claim 10 wherein:
the power module DOF servoloop means includes:
 vertical position servoloop operation means;
 vertical load servoloop operation means;
 roll position servoloop operation means;
 roll centroid servoloop operation means;
 pitch position servoloop operation means;
 pitch centroid servoloop operation means; and
 warp position servoloop operation means;
the power module mode select means includes:
 vertical mode select means for selecting servoloop output commands from either the vertical position operation means or the vertical load servoloop operation means, and means for coupling the selected servoloop output commands to the power module DOF output sum means;
 roll mode select means for selecting servoloop output commands from either the roll position servoloop operation means or the roll centroid servoloop operation means, and means for coupling the selected servoloop output commands to the power module DOF output sum means; and
 pitch mode select means for selecting servoloop output commands from the pitch position servoloop operation means or the pitch centroid servoloop operation means, and means for coupling the selected servoloop output commands to the power module DOF output sum means.

12. The control system of claim 1 wherein:

the memory means includes means for storing servoloop gain compensation parameter data; and the DOF servoloop means includes means for computing the servoloop output commands as a function of the gain compensation parameter data.

13. A degree of freedom (DOF) control system for control of the movement of a body in a plurality of degrees of freedom, the control system comprising:

motion actuators responsive to actuator commands for applying force to the body at a plurality of mutually spaced locations;

feedback means for providing feedback information relating to changes in position of selected points on the body; and signal processing means for generating the actuation commands, the signal processing means including:
memory for storage of contemporaneous servoloop output commands, feedback information and DOF feedback sums;

feedback summing means responsive to the feedback information accessed from memory for generating DOF feedback sums and storing DOF feedback sums to memory;

command means operating on a motion control procedure for generating servoloop input commands;

DOF servoloop means for generating the servoloop output commands as a selectable function of the DOF feedback sums and the servoloop input commands; and DOF summing means responsive to the servoloop output commands for generating actuator commands.

14. The control system of claim 13 wherein:
the feedback means includes;
position feedback sensors for providing position information relating to selected points on the body; and
load feedback for providing load information occurring at selected points on the body;
the feedback summing means being further responsive to the position feedback data and load feedback data accessed from memory for generating the DOF feedback sums including, position feedback sums, load feedback sums and centroid feedback sums.

15. The control system of claim 14 wherein:
the servoloop input command signals generated by the command means include position servoloop input command signals, load servoloop input commands and centroid servoloop input commands; and,
the servoloop output commands generated by the DOf servoloop means include, position servoloop output commands, load servoloop output commands and centroid servoloop output commands, each being generated as a function of associated DOF feedback sums and servoloop input commands.

16. The control system of claim 15 and further comprising:
mode select means for selecting from among the servoloop output commands as determined by the motion control program; and
DOF output sum means for generating the actuator commands as a function of the selected servoloop output commands.

17. The control system of claim 16 wherein the feedback means further comprises means for providing associated substantially contemporaenous sets of position and load feedback information and means for providing handshake signals associated with generation of the mutually contemporaneous sets of position and feedback information.

18. The control system of claim 17 wherein the DOF feedback sum means generates position DOF feedback sums, load DOF feedback sums and centroid DOF feedback sums in response to the handshake signals.

19. The control system of claim 18 wherein:
the memory includes contemporaneous value memory for storing:
the position feedback information and load feedback information provided by the feedback means;
the position, load and centroid DOF feedback sums computed by the DOF feedback sum means;
the position, load and centroid servoloop input commands computed by the command generator means; and
the position, load and centroid servoloop output commands computed by he DOF servoloop means;
he DOF feedback sum means includes means for accessing the current value memory to obtain position and load feedback data, and means for storing the computed DOF feedback sums in the current value memory;
the DOF servoloop means includes means for accessing the current value memory to obtain the servoloop commands and DOF feedback sums, and means for storing the computed servoloop output commands in the current value memory; and
the DOF output sum means includes means for accessing the current value memory to obtain the DOF servoloop output commands, and means for storing the computed actuator commands in the current value memory.

20. The control system of claim 16 wherein:
the memory includes means for storing DOF feedback sum limit information; and
the signal processing means further includes DOF feedback sum limit checking means for comparing the DOF feedback sums to the stored DOF feedback sum limit information.

21. The control system of claim 16 wherein:
the motion actuators include:
moving ram actuators rseponsive to moving ram actuator commands; and
power module actuators responsive to power module actuator commands; and
the signal processing means further includes:
moving ram control means for generating the moving ram actuator commands;
power module control means for generating the power module actuator commands; and
press control means coupled to the memory for controlling the moving ram control means and power module control means as a function of the motion control information.

22. The control system of claim 21 wherein the moving ram control means includes:
moving ram DOf feedback sum means for computing position DOF feedback sums and load DOF feedback sums as a function of the position feedback information and load feedback information;
moving ram command means for generating position servoloop input commands and load servoloop input commands as a function of the motion control procedure;

moving ram DOF servoloop means for generating position servoloop output commands and load sevoloop output commands as a function of associated DOF feedback sums and servoloop input commands;

moving ram mode select means for selecting servoloop output commands from the position servoloop output commands and load servoloop output commands as a function of the motion control procedure; and moving ram DOF output sum means for computign the moving ram actuator commands as a function of the selected servoloop output commands.

23. The control system of claim 21 wherein the power module control means includes:

power module DOF feedback sum means for generating position DOF feedback sums, load DOF feedback sums and centroid DOF feedback sums as a function of the position feedback, information and load feeback information;

power module command means for generating position servoloop input commands, load servoloop input commands and centroid servoloop input commands as a function of the motion control procedure;

power module DOF servoloop means for generating position servoloop output commands, load servoloop output commands and centroid servoloop output commands as a function of the associated DOF feedback sums and servoloop input commands;

power module mode select means for selecting servoloop output commands from the position servoloop output commands, load servoloop output commands and centroid servoloop output commands as a function of the motion control procedure; and power module DOF output sum means for computign the power module actuator commands as a function of the selected position, load and centroid servoloop output commands.

24. The control system of claim 22 wherein:

the moving ram DOF servoloop means includes:
a vertical load servoloop operator;
a vertical position servoloop operation;
roll position servoloop operator; and
roll load servoloop operator;

the moving ram mode select means includes:
vertical mode select means for selecting output commands from either the vertical load servoloop operator or the vertical position servoloop operator, and means for coupling the selected servoloop output commands to the moving ram DOF output sum means; and roll mode select means for selecting servoloop output commands from either the roll position servoloop operator or the roll load servoloop operator, and means for coupling the selected servoloop output commands to the moving ram DOF output sum means.

25. The control system of claim 23 wherein:

the power module DOF servoloop means includes:
a vertical position servoloop operator;
a vertical load servoloop operator;
a roll position servoloop operator;
a roll centroid servoloop operator;
a pitch position servoloop operator;
a pitch centroid servoloop operator; and a warp position servoloop operator;

the power module mode select means includes:
vertical mode select means for selecting servoloop output commands from either the vertical position operator or the vertical load servoloop operator, and means for coupling the selected servoloop output command to the power module DOF output sum means;

roll mode select means for selectign servoloop output command from either the roll position servoloop operator or the roll centroid servoloop operator, and means for coupling the selected servoloop output commands to the power module DOF output sum means; and pitch mode select means for selecting servoloop output commands from the pitch position servoloop operator or the pitch centroid servoloop operator, and means for coupling the selected servoloop output commands to the power module DOf output sum means.

26. The control system of claim 13 wherein:

the memory includes means for storing servoloop gain compensation parameter information; and the DOF servoloop means includes means for changing the servoloop gain compensation parameter information as a function of the servoloop input command.

27. The control system of claim 13 wherein:

the memory includes means for storing servoloop gain compensation parameter information; and the DOF servoloop means includes means for changing the servoloop gain compensation parameter information as a function of the DOF feedback sums.

* * * * *

UNITED STATES PATENT AND TRADEMARK OFFICE
CERTIFICATE OF CORRECTION

PATENT NO. : 5,068,779

DATED : November 26, 1991

INVENTOR(S) : Michael T. Sullivan et al.

It is certified that error appears in the above-identified patent and that said Letters Patent is hereby corrected as shown below:

Col. 20, line 18, delete "command" and insert --commands--.

Col. 20, line 35, delete "dn" and insert --and--.

Col. 20, line 35, after "and", insert --handshake signals representative of the--.

Col. 21, line 29, delete "movign" and insert --moving--.

Col. 24, line 22, delete "he" and insert --the--.

Col. 24, line 24, delete "he" and insert --the--.

Col. 24, line 48, delete "rseponsive" and insert --responsive--.

Col. 24, line 63, delete "DOf" and insert --DOF--.

Col. 25, line 5, delete "sevoloop" and insert --servoloop--.

Col. 25, line 13, delete "computign" and insert --computing--.

Col. 25, line 21, delete "," after "feedback".

Col. 25, line 22, delete "feeback" and insert --feedback--.

UNITED STATES PATENT AND TRADEMARK OFFICE
CERTIFICATE OF CORRECTION

PATENT NO. : 5,068,779

DATED : November 26, 1991

INVENTOR(S) : Michael T. Sullivan et al.

It is certified that error appears in the above-identified patent and that said Letters Patent is hereby corrected as shown below:

Col. 25, lines 39-40, delete "computign" and insert --computing--.

Col. 26, line 26, delete "selectign" and insert --selecting--.

Col. 26, line 37, delete "DOf" and insert --DOF--.

Signed and Sealed this

Sixteenth Day of March, 1993

*Attest:*

STEPHEN G. KUNIN

*Attesting Officer*     *Acting Commissioner of Patents and Trademarks*